May 3, 1938.  A. Y. DODGE ET AL  2,115,987
TRANSMISSION
Filed March 1, 1934   6 Sheets-Sheet 5

INVENTORS
Adiel Y. Dodge
Ernest R. Koppel
BY
ATTORNEY

Patented May 3, 1938

2,115,987

UNITED STATES PATENT OFFICE 2,115,987

TRANSMISSION

Adiel Y. Dodge and Ernest R. Koppel, South
Bend, Ind.; said Koppel assignor to said Dodge Application March 1, 1934, Serial No. 713,503

18 Claims. (Cl. 74—260)

This invention relates to transmissions, and is illustrated as embodied in an automatic automobile transmission of the centrifugal impulse type.

Objects of the invention are to permit the transmission to be operated either with or without free wheeling, preferably both in low and in high gear, to provide a positive low-gear drive in reverse, to provide a transmission of this type permitting the engine to be cranked by pushing the car and which will hold the car in positive gear when parked, to provide for holding the car automatically in case the engine stalls or the clutch is thrown out on a grade and preferably in which the holding means may be released by depressing a pedal or the like, and to secure the above and other objects by the use of simple and inexpensive mechanism which runs smoothly and quietly.

While not essential to the attainment of all of the above objects, we prefer to embody our improvements in a transmission having two paths of power flow from the engine-driven driving member to the driven member of the transmission. In the illustrated arrangement, the driving shaft has two driving elements, one of which is shown as a flywheel or the like, having weighted pinions or other devices forming part of an impulse type speed-varying torque-amplifying means, and the other of which is a novel sun gear spaced axially some distance from the flywheel.

Preferably the impulse driving mechanism and the sun gear act on different elements of a novel differential gear unit which in turn drives the driven shaft of the transmission. The impulse mechanism is releasably held against any backward movement, so that in starting the car the sun gear gives a positive low gear. The parts all turn together to give a one-to-one drive at high speed. The impulse mechanism is effective to cooperate with the sun gear to operate the differential unit to give a progressively-varied torque-amplifying intermediate speed drive.

One feature of novelty relates to the shifting axially of the novel differential unit without disengaging it from the sun gear, or otherwise varying the connections of the various parts, not only to give reverse and forward drives but preferably also to render effective or ineffective one or more free-wheel units to give a choice of free-wheeling or positive drive either in low gear on in direct drive or both. The particular transmission illustrated has five positions of the differential unit, giving various speed and direction and free-wheeling or positive drive combinations as described below, but it is not essential to use all of these positions to secure many of the advantages of the invention.

Other features of novelty relate to a simple but powerful brake or clutch device releasably to hold the reactance member of the impulse mechanism, to an arrangement of springs so that the impulse mechanism both drives and reacts yieldingly, and to other novel combinations of parts and desirable particular constructions which will be apparent from the following description of the illustrative embodiment shown in the accompanying drawings, in which Figure 1 is a sectional longitudinal view generally along the center line or axis;

Figure 1:
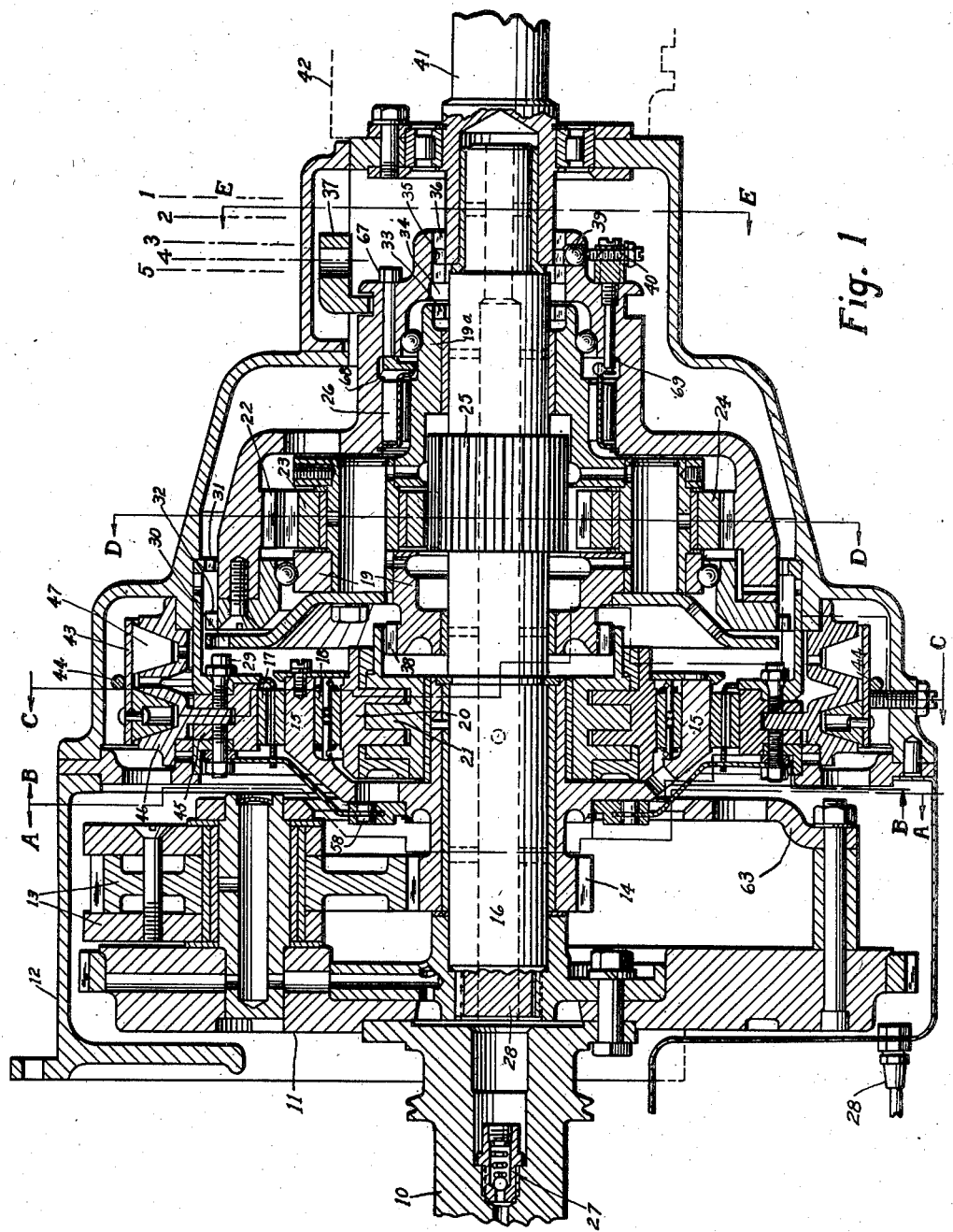

In Figure 1, part 12 is a suitable transmission housing, which bolts directly to crankcase of the engine. Enclosed therein is a fly-wheel 11, concentrically fastened to the end of the engine crank shaft 10. Concentric to the main axis of the crank shaft there is a main transmission shaft 16, which is centered in and splined to the fly-wheel hub. Therefore shaft 16 turns as a unit with the crank shaft and fly-wheel.

Integral with or fixedly secured to the shaft 16 is one of the two driving members, shown as a sun gear 25. The rear end of the shaft 16 is journaled in a driven shaft 41 forming the driven element of the transmission. Driven shaft 41 may have a rear bearing (not shown) located in the rear end of a housing 42. The housing 42, shown dotted may also contain the usual speedometer drive (not shown).

Counter-weighted planets or pinion gears 13 secured to the fly-wheel 11 (which may be regarded as the second of the two driving members of shaft 16) are caused to turn about their own axes, due to engagement with a sun gear 14 mounted on the shaft 16. In turning, the counter-weighted planets set up positive and negative impulses in the sun gear 14, in accordance with principles well known to the art.

Ring or sleeve 15 is rigidly connected with sun gear 14, and is loosely sleeved on the shaft 16, and is therefore acted upon by the positive and negative impulses referred to.

Through a one-way roller-type clutch 18, the positive impulses are imparted to a member 20, and by member 20 are transmitted through springs 48 (shown in Figure 5) to a coaxial part 21 rotatably mounted on the sleeve 15. As shown, part 21 is coupled to part 19 (i. e. to the gear carrier of the novel differential unit described below) at 38 by intermeshing clutch teeth which are disengaged when part 19 is moved axially to the right by shifting the novel differential unit. Part 19 forms the cage or gear carrier for planet gears 23 and 24, which are arranged in pairs in tandem, as shown in Fig. 6, and as more fully described below.

Planet gears 23 and 24, being so arranged in pairs, cause a ring gear 22 to revolve in the same direction as does the sun gear 25 and the gear carrier 19. The driven shaft 41 of the transmission is driven in forward drive by the ring gear 22 through connections such as intermeshing clutch teeth 35 and 36. Thus the shaft 10 drives through shaft 16 and through both sun gear 25 and through the impulse mechanism to the differential unit which in turn drives the driven shaft 41.

The planet gears 23 and 24 become the intermediate or differential members by making the gear carrier 19 a reactionary member. Due to the reaction of the negative impulses, the gear carrier 19 tends during those impulses to revolve in a reverse direction, but is arrested by the one-way clutch 18, the ring 15, another one-way clutch 17, a ring 45 and its springs 49 (shown in Figure 5) and brake or holding members 46 and 47, all comprising parts of a reactance means yieldingly preventing reverse motion of the gear carrier 19.

Should the positive impulses occurring in the ring or driving member 15 be of sufficient magnitude, planet gear carrier 19 will be caused to revolve forwardly. The one-way clutch 17 will overrun; and will be disengaged by an exciter ring 58, as described later.

When the novel differential-gear unit or assembly contained in and comprising the housing of the ring gear 22 is shifted forward until a disc 30 engages one or more studs 29, the impulse action of the counter-weighted planets 13 and the sun gear 14 is prevented, i. e., when in this position the gear chain in the housing of the ring gear 22 functions as a positive gear transmission providing a definite low speed ratio regardless of whether the engine is driving the car or the car is trying to drive the engine. In the position shown, with the disc 30 and studs 29 disengaged, a definite mechanical low speed is provided, so long as the engine tends to drive the car. Should the car tend to drive the engine, the ring gear 22 would run ahead at some faster speed, giving free-wheeling.

The different positions, 1, 2, 3, 4, and 5 referred to later, into which the differential unit may be shifted, are illustrated as positions of the center line of the hole in a shift yoke 37. When the transmission is in position 3, the teeth 35 do not depress ball 39. When the ball 39 is not depressed, a one-way roller-type clutch 26 is allowed to engage to prevent free-wheeling by preventing the housing of ring gear 22 from turning ahead of 19ᵃ, which is a portion of the gear carrier 19.

By shifting the center line 4 of the shift yoke 37 to position No. 1, the transmission is set for reverse drive, in which case clutch teeth 32 engage teeth 31 to hold the ring gear and teeth 33 disengage the teeth of part 21, while teeth 33 of the gear carrier engage teeth 35 of the driven shaft 41. In this position the sun gear 25 becomes the driver, ring gear 22 the fixed member so long as clutch or brake holding member 43 is engaged, and the planet gear carrier 19 becomes the driven member and drives the shaft 41 in reverse. The positive and negative impulses caused by counterweighted planets 13 are in this case ignored and allowed to run free, since communication is disconnected at 38.

When the transmission is set in position No. 2, teeth 35 fall in the open space 34, thus giving no connection between the transmission proper and the driven shaft 41, hence giving a neutral position. The friction brake or holding device 43 may be manipulated in the usual manner to facilitate shifting from position No. 2 to positions 1 and 3.

Figure 2:
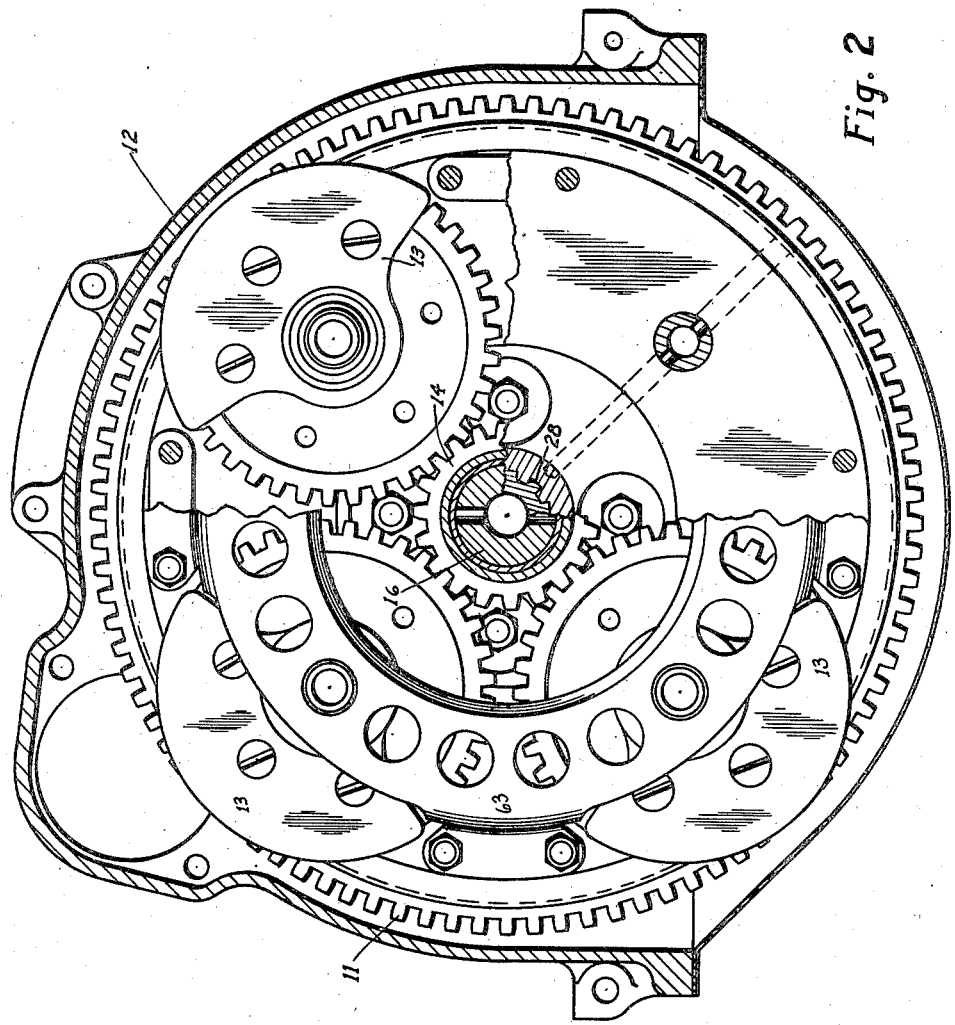
Figure 2 is a transverse section across the axis at A—A of Figure 1.
Figure 3:
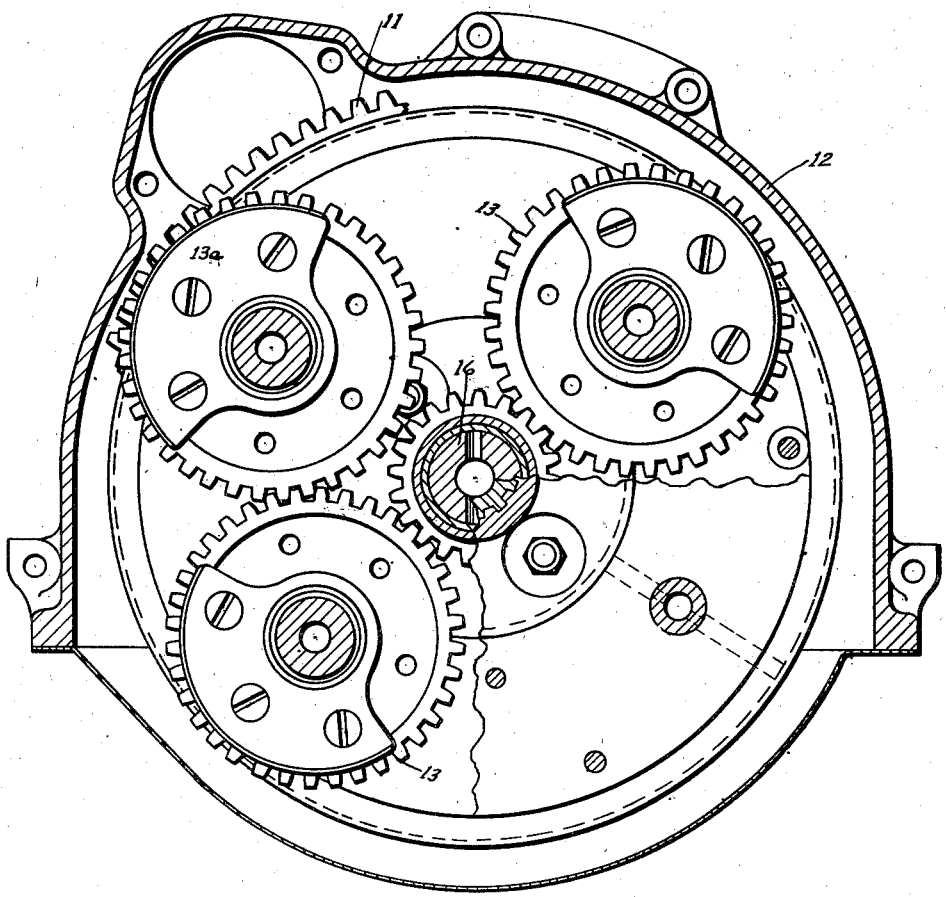
Figure 3 is a view similar to Figure 2 showing a modification with counter-weighted gears arranged in pairs.

Figure 2 is a section across the axis at line A—A of Figure 1. In this figure one arrangement of the planet gears is shown, one gear being omitted to show an oil passage from the crank shaft to the center pin. In Figure 3, counter-weighted planet gears 13 are shown meshing in pairs so that they revolve in the opposite direction to the counter-weighted planets 13.

In Figure 3, the planet gears are arranged in pairs and turn in opposite directions. This arrangement gives two advantages, as follows: First, the centrifugal forces acting about the centers of the individual planets can be calculated substantially to cancel each other, thus leaving the centrifugal force about the main center free to function as a single force. Second, the spacing or location of the counter-weights in relation to each other can be altered (without affecting the running balance) to change the characteristics over that of the arrangement shown in Figure 2, where all planets turn the same direction.

One of the changes in characteristics referred to is as follows: The arrangement shown in Figure 2 produces impulses of a character very closely resembling a wave of sine form; whereas by staggering the weights in the arrangements shown in Figure 3, the impulses may be modified so that the wave representing their character becomes more flat on top and bottom with steeper slopes. This is brought about by prolonging the duration of the maximum positive force and also the maximum negative force in each cycle. This gives a more abrupt change from positive to negative, more time at the crest and valley, and less time in changing from crest to valley. The weights of planets 13 of Figure 3 may be either the same or different to suit conditions. By this arrangement much flexibility is afforded the designer.

Figure 4:
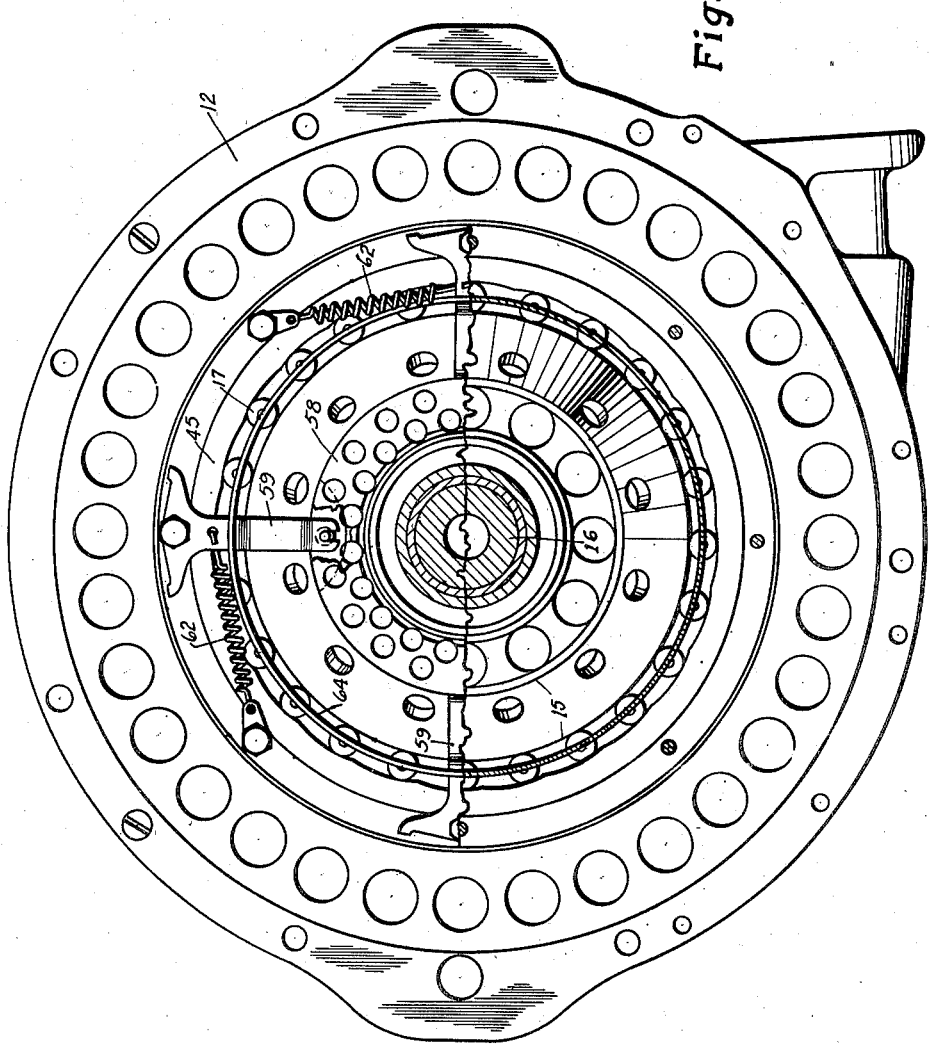
Figure 4 is a transverse section across the axis at B—B.

Figure 4 is a transverse section along line B—B of Figure 1. In this figure part 58 is an exciter ring arranged to turn freely about the main center, with the exception of its restriction due to an exciter lever 59. The exciter ring 58 is urged, due to oil friction, in the direction of rotation of ring 15. The urge is increased by a series of small holes in the ring 58, and larger holes in the ring 15, due to the impact of oil against the walls of these holes.

Spring 62 urges the lever 59 to the left, as shown, to shift the cage of the clutch rollers 17. It will be noticed that exciter lever 59 is of T shape, the upper portion of the T forming stops to limit its movement. Normally, spring 62 holds lever 59 swung to the left towards its corresponding stop, thus shifting the cage of the roller clutch 17 counter-clockwise. This holds rollers 17 in position on their cam surface on part 45, ready for engagement to absorb negative impulses. The negative impulses are in a counter-clockwise direction when viewed from the direction B—B. Thus, rollers 17 are normally held in a position to arrest negative impulses. Positive impulses tend to turn the ring 15 clockwise, and drag the ring 58 clockwise, thus shifting the lever 59 to the right, stretching the spring 62 and shifting the cage of the rollers 17 clockwise. When so shifted, the rollers are in a position, in relation to the cam surfaces on member 45, in which they release.

Figure 5:
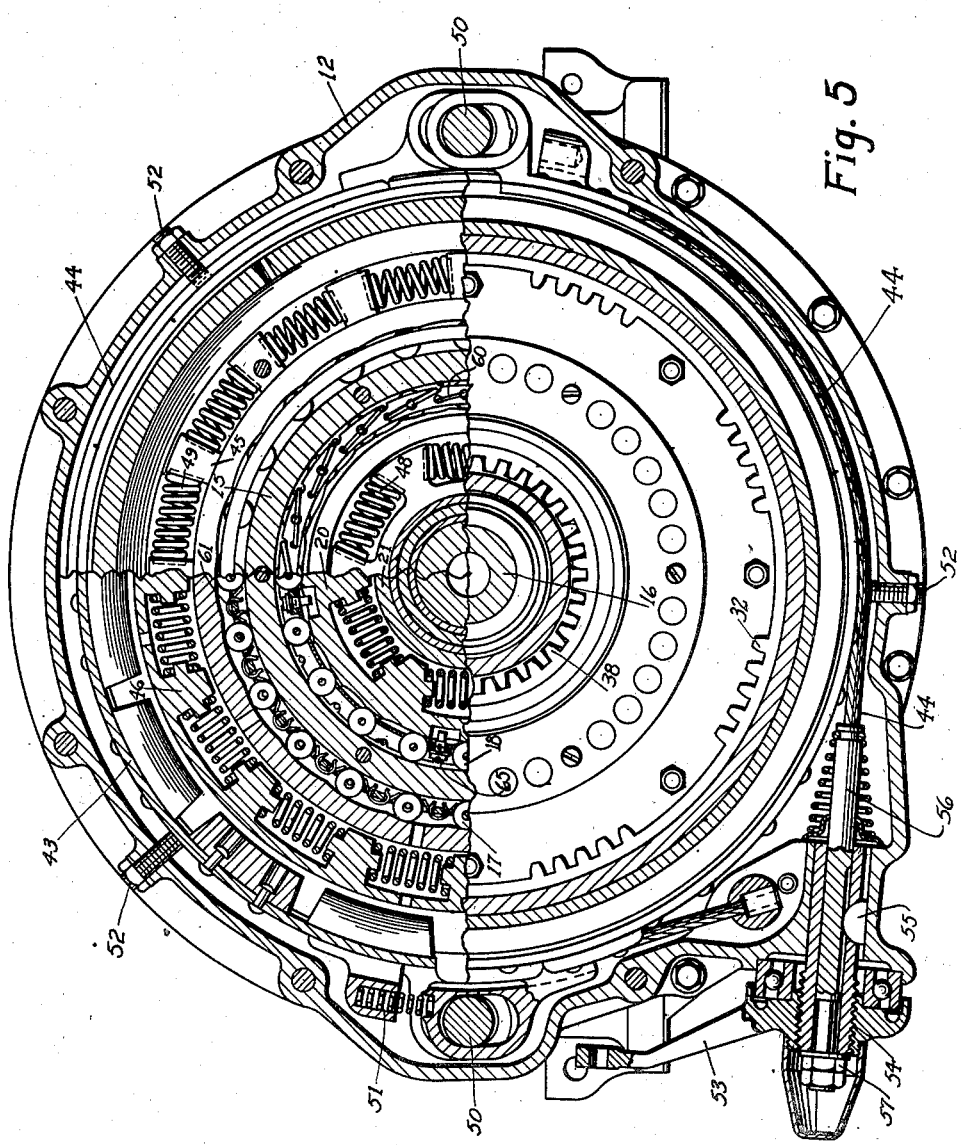
Figure 5 is a transverse section across the axis at C—C.
Figure 6:
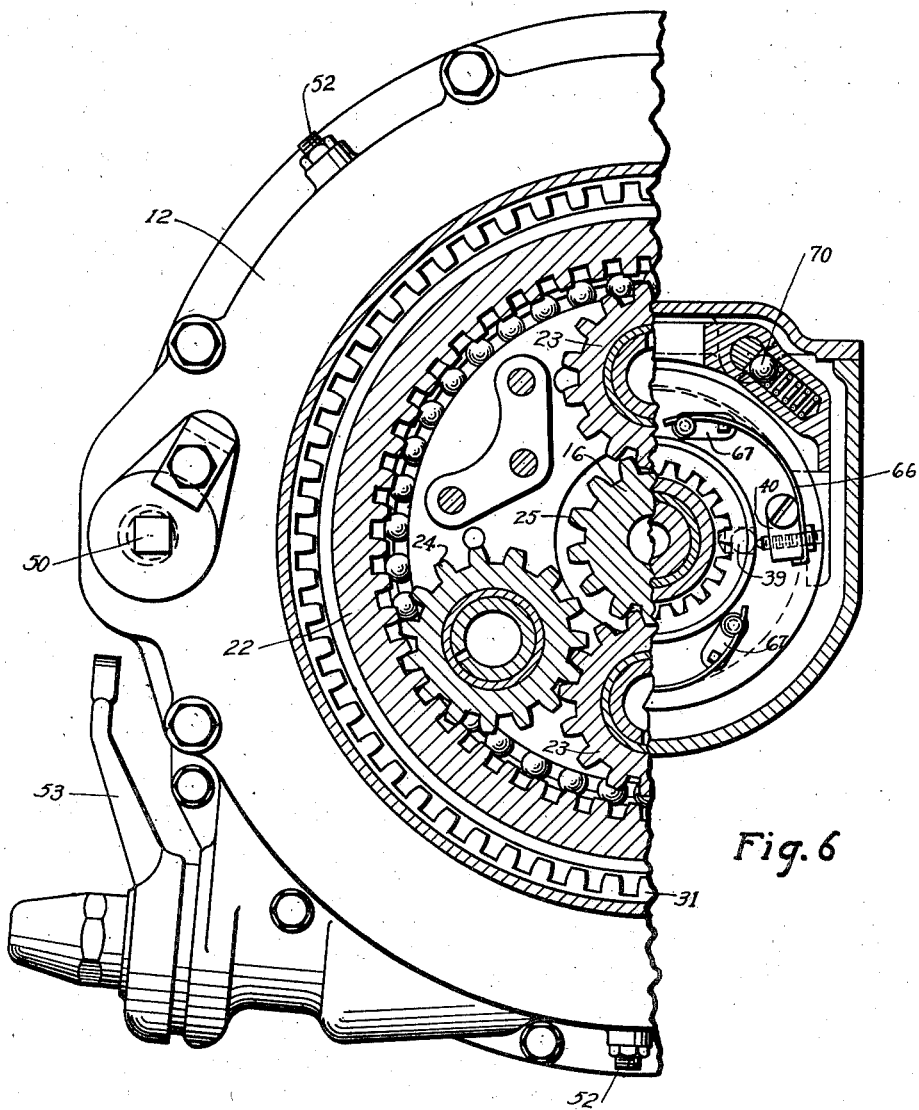
Figure 6 is a transverse section across the axis partly at D—D and partly at E—E.

Referring to Figure 5, it will be seen that each roller 17 is provided with a spring 61, which urges the rollers 17 outwardly. In this way, the rollers 17 are urged away from the cylindrical surface of ring 15, so that they will not be subjected to drag over the surface of the ring 15, during positive impulses, or during the time of running in one to one ratio during high speed drive.

Figure 5 is a transverse section along the line C—C of Figure 1. In this figure, lever 53 is the actuating lever to tighten and loosen a cable 44. By tightening the cable 44, the friction member 43 is caused to contract, and engage its friction surface. By loosening the cable 44 the friction member 43 is allowed to expand, and disengage its friction surface. Release springs 51 cause the friction band 43 to expand. The illustrated friction brake or holding means is composed of two bands, or an upper and a lower half band, each anchored at its ends at two points on anchors or posts marked 50 at the right and at the left. The bands are provided at their ends with suitable yokes or slotted anchor lugs to engage the abutments 50 to allow each band to be self-actuating, in either direction, due to a one-half wrap about one or the other of the abutments, depending upon the direction of rotation of the friction surface. In this way the friction member comprises an external contracting double-half-wrap brake-type member or holding means.

The bands may be provided with series of friction blocks, which may be made of metal shaped to engage a V pulley-like member 46, which also may be metal. By means of the V shapes the holding power is increased, or in effect the coefficient of friction is increased, as related to the wrapping action of the bands.

Lever 53 is moved rearwardly to loosen cable 44, by means of a suitable spring (not shown) hooked to a chassis cross member (not shown). The cable is tightened by depressing a clutch pedal (not shown) which is hooked by suitable linkage (not shown) to the lever 53.

The yieldable coupling between one-way clutch 17 and friction means 43 is also shown in Figure 5, and is composed of a series of compression springs 49 arranged between projections on the members 46 and 45. As shown in Figure 1, member 46 has lugs or projections extending down and between pairs of projections on the member 45. The springs 49 are sufficiently large in diameter to engage both the projections of member 45 and of member 46. Any change in the angular relation between parts 45 and 46 in either direction will compress all of the springs 49. In this way, a yieldable coupling is provided between parts 45 and 46, effective in either direction of revolution.

In Figure 5 the roller clutch 18 is also shown. Each roller 18 is provided with a small shaft through its center, which extends through the cage for the rollers 18 and engages one of the springs 60. Springs 60 urge the shaft radially outward, thus urging the rollers radially outward. The holes in the cage for the rollers 18, through which the shafts pass are enlarged sufficiently to allow for a slight radial movement. In this way the rollers 18 are held in engagement with the inner surface of the ring 15.

The cage of the rollers 18 is provided with suitable stops 65, which contact notches in the part 20, so that the cage with the rollers 18 may change its angular relation with respect to part 20 a limited amount; viz, it may shift to a completely disengaged position, or to a completely engaged position when 20 turns clockwise, and preferably a little further to allow for wear. It will be seen by this arrangement that the rollers are normally held in engagement with the inner cylindrical surface of the ring 15, and are free to be revolved about their axes, and are therefore subject to roller friction only during overrunning conditions. But should part 20 overtake part 15 in a clockwise direction, the rollers will engage the cam surface of the part 20 after a slight movement takes place.

To further insure the engagement of the one-way clutch rollers 18, the shafts through their centers may if desired be divided, and a compression spring placed there-between (as shown in Figure 1) to urge the right and left ends of the shafts against the side walls of member 15. This wiping action at some or all of the rollers will insure shifting of the cage of rollers 18 to and from released position.

As just described, and as previously described in connection with Figure 4 it will be seen that neither of the one-way clutches comprising rollers 17 and 18 is subjected to sliding friction during overrunning.

The yieldable coupling shown in Figure 5, between parts 20 and 21, is similar in construction to the yieldable coupling previously described, between parts 45 and 46.

In Figure 6, the arrangement of the planet gears 23 and 24 in pairs is shown. It will be noticed that the outer planet gear 24 engages the ring gear 22, and the planet gear 23, but that the planet gear 23 engages the sun gear 25 and not the ring gear 22. By the arrangement of the planet gears in pairs in this way, the ring gear 22 is caused to revolve in the same direction as does the sun gear 25, when the cage of the planets 24 and 23 is held or retarded. It is because of this arrangement that the ring gear 22 may be used as the driven member of the differential unit. It is partly because of this arrangement also that the other various combinations are secured by simply shifting axially the entire novel differential unit including the planet assembly housed in the housing of the ring gear 22.

On the right side of Figure 6 are shown the connections which control the one-way clutch 26. The movement of the ball 39 moves a lever 40 and a lever 67 through a spring connection 66. The movement of the lever 67 moves a lever 68, shown in Figure 1, to shift the cage of the rollers 26.

Ball 70 is part of the usual ball latch to retain yoke 37 in its various positions 1, 2, 3, 4, and 5.

The parts of this transmission are furnished lubrication from the circulating oil system of the engine. Oil comes in through a reducing valve 27, which is set at a pressure somewhat lower than the reducing valve of the main lubricating system of the engine. Oil is transmitted through the center of the shaft 16, and is allowed to reach the various bearings and journals along shaft 16 by suitable oil holes, shown in dotted lines. Oil is also passed out radially through suitable oil holes in the flywheel to communicate with holes in the pins on which the planet gears 13 and 13ª are mounted, to lubricate their journals.

Other parts of the transmission are lubricated by oil thrown radially, and which seeps through the various bearings along the shaft 16, and by splash lubrication thrown up from the bottom of the case. A return passage 28, is provided to the sump of the engine. Passage 28 is set somewhat above the bottom of the transmission case to insure that some oil will remain in the bottom of the transmission case at all times.

In operation, this is an automatic transmission for automobiles providing all speeds, steplessly, from a positive low to a one-to-one high without shifting. All gears are in mesh all of the time; no gears roll while operating in high gear. Also this transmission is provided with positive reverse, positive low, free wheeling or positive drive, as and when desired.

A car equipped with this transmission can be operated by any driver without additional practice. All of the operations are the same as present operations, and also in the same order; except that the movements of shifting into second and high have been eliminated. Thus no new technique need be learned.

The transmission eliminates the necessity of shifting after once starting. It has, however, five different positions for the shift lever. These positions provide the following, given in the order of the position of the shift lever from forward position No. 1 shifting back to positions Nos. 2, 3, etc., viz.:

No. 1. Reverse, positive at a ratio of 3.55 to 1, without free wheeling;
No. 2. Neutral;
No. 3. Forward, at all ratios between 3.55 to 1 and 1 to 1 without free wheeling;
No. 4. Same as No. 3 with free wheeling; and
No. 5. Forward, positive low; without free wheeling and at a 3.55 to 1 ratio.

The transmission is arranged to provide a straight-line shift to accomplish the above, thus providing extreme flexibility as to where the shift lever may be placed. The shift lever may be placed in the conventional position, or on the instrument board, or on the steering column. The gear ratios specified herein are subject to modification in the design to suit conditions. In the illustrated transmission a sufficiently low ratio for low was selected so that the rear axle ratio might be changed from 4.375 to 1 to 3.5 to 1, which is desirable in order to secure all of the many advantages to be had from a variable speed transmission. In addition, with such an arrangement a surprisingly large fuel economy may be effected and an increase of acceleration.

While the shift lever has five positions, only two of the positions will be used most of the time; namely, neutral #2 and forward #3. It is not necessary to shift into neutral at stop-lights or in traffic; in fact, no shifting at all is required at this time. When in position #3, the first position back of neutral, the car starts out in a positive low gear at a ratio of 3.55 to 1.

By balancing the engine torque against the required torque to drive the car, the speed ratio automatically changes to meet conditions and varies from 3.55 to 1 up to 1 to 1. The rate at which this change takes place is dependent upon road conditions, such as gradient and the like, and upon the position of the accelerator pedal (controlled by the operator as usual). Starting from rest in this position the operator may step lightly or heavily, or as he pleases upon the accelerator. Should the operator start out with the accelerator completely depressed, it is estimated that the car will stay in a low gear ratio of 3.55 to 1 on the level until a speed of 12 to 16 miles an hour is reached. Should the operator continue to hold the accelerator down, the transmission will pass through various automatic ratios, steplessly, until 1 to 1 is reached. It is estimated that 1 to 1 will be reached under these conditions (accelerator fully depressed) at a car speed of about 55 miles per hour. From this speed on up the transmission will be in direct drive, all parts revolving as a unit.

Since this transmission has only one axis and the use of engine oil is contemplated for lubrication, the resistance of the transmission at all speeds will be less than in the present transmission and at high speeds there will be no loss due to idling gears running in heavy lubricant. After arriving at a direct drive of 1 to 1 the transmission will remain in 1 to 1 with the accelerator completely depressed until the car speed has been brought down to 35 miles per hour by some external force, such as a hill.

Should the operator be driving at 45 miles per hour with his accelerator part way up and step down on the accelerator gradually to increase the speed, the car will pick up in speed according to direct drive. However, should the operator desire a somewhat lower gear for faster acceleration from this speed of 45 miles per hour, this may be attained by letting up on the accelerator for a fraction of a second and immediately depressing the accelerator thereafter. This operation will bring back the former conditions described so that a reduced gear ratio (in the neighborhood of 1½ to 1 average) may be had up to a speed of about 50 miles an hour.

The foregoing description is predicated on the condition of the accelerator being completely depressed. Direct drive may be secured at very much lower speeds by partially depressing the accelerator, and likewise the car will remain in direct drive at various speeds as desired and controlled by the depression of the accelerator; i. e., the less the accelerator is depressed, the less will be the engine torque. With the lesser engine torque the sooner will direct drive be arrived at and maintained.

Should the operator desire free wheeling, the shift lever can be moved back from position #3 to position #4, thus producing complete free wheeling with performance otherwise similar to that described for position #3.

While in position #3 any attempt of the car to over-run immediately finds the transmission in direct drive, causing the engine to turn at a corresponding speed to the car, resulting from direct drive.

Should the operator encounter an icy hill, he may shift the lever to position #5, in which position he is locked in positive low, thus furnishing him the emergency position desirable for descending an icy hill as required by law.

The above calculations are based on a rear axle ratio of 3.5 to 1.

The negative impulses described above are arrested yieldingly by a fixed one-way clutch returning the energy to the fly-wheel. The positive impulses are arrested yieldingly by a one-way clutch and imparted to the planetary gears of the planetary differential gear while the sun gear of this gear set is turned positively at engine speed at all times. By this arrangement the variable speed mass inertia arrangement is not required to handle the full torque as in most other arrangements. Also, by this arrangement the desired acceleration curve may be very closely approximated, which is not the case with most mass inertia centrifugal drives alone.

The clutch is built into this transmission and forms an integral part thereof. The clutch is controlled by a clutch pedal in the same manner as that in use on standard transmissions, or an automatic vacuum clutch control of well known design may be installed. Therefore, the handling of a car equipped with this transmission offers no new problems to the driver.

While one illustrative embodiment has been described in detail, it is not our intention to limit the scope of the invention to that particular embodiment, or by that description, or otherwise than by the terms of the appended claims.

We claim:

1. An automatic transmission including a driving shaft having two driving members and a differential three-element gear having one element the driven member, means forming a driving connection between one of said driving members and another element of the gear, means forming a driving connection between the other driving member and a third element of the gear, one of said means comprising a device driven by said one member and having impulses imparted thereto in opposite directions, spring one-way reactance means yieldingly holding said device against the force of the impulses in one direction, yielding means driven through springs by the impulses in the other direction, and driving connections between the yielding means and the said last-named driven element.

2. An automatic transmission comprising a constant mesh gear set having driving and driven elements to produce a positive low gear drive, an automatic torque amplifying variable speed drive unit connected to the gear set, said unit and set being so constructed and arranged that they will produce a torque amplifying variable speed drive automatically changing progressively from low to high, a free wheel unit connected to the driven element of the gear set to prevent the same from over-running a driving element thereof or to permit such over-running, and manual means to render said unit selectively operative or inoperative without interfering with the automatic change of speed from low to high.

3. A transmission including an engine-driven driving shaft having two axially spaced driving elements, an automatic variable-speed torque-amplifying mechanism arranged between said elements and driven by one of said elements, a differential mechanism having two driving parts driven respectively by said mechanism and said other driving element and having a driven part actuated at different speeds by the driving parts, means for shifting said differential mechanism bodily axially of the transmission, a driven element of the transmission, a free-wheel unit, a connection through which the driven part of the differential mechanism drives said driven element of the transmission and in which the free-wheel unit is effective in one axial position of said mechanism, and means for rendering said unit ineffective when the mechanism is shifted to another axial position.

4. A transmission including an engine-driven driving shaft having two axially spaced driving elements, an automatic variable-speed torque-amplifying mechanism arranged between said elements and driven by one of said elements, a differential mechanism having two driving parts driven respectively by said mechanism and said other driving element and having a driven part actuated at different speeds by the driving parts, means for shifting said differential mechanism bodily axially of the transmission, means for connecting said variable speed mechanism and said differential mechanism to drive said driven part in one direction in one axial position of the differential mechanism, and means for connecting said two mechanisms to drive said driven part in the other direction in another axial position of the transmission.

5. A transmission comprising three coaxially arranged members, the center one of which is an impulse-driven driving member, oppositely effective one-way clutch means between the other two members and the inner and outer surfaces of the driving member respectively, a reactance member having springs through which it holds yieldingly one of said other two members, and a driven member having springs through which it is yieldingly driven by the other of said two members.

6. A transmission comprising three coaxially arranged members, the center one of which is an impulse-driven driving member, oppositely effective one-way clutch means between the other two members and the inner and outer surfaces of the driving member respectively, a reactance member holding one of said other two members, and a driven member having springs through which it is yieldingly driven by the other of said two members.

7. A transmission comprising a driving sun gear having relatively wide teeth, a differential unit comprising a ring gear and a gear carrier having planet gears meshing with the ring gear and the sun gear, a driven member for the transmission, means for shifting the unit axially without disengaging the planet gears and the sun gear, and means operated by shifting of the unit for selectively connecting either the ring gear or the gear carrier to the driven member.

8. A transmission comprising a driving sun gear having relatively wide teeth, a differential unit comprising a ring gear and a gear carrier having planet gears meshing with the ring gear and the sun gear, a driven member for the transmission, means for shifting the unit axially without disengaging the planet gears and the sun gear, clutch means carried by the driven member, and complementary clutch means carried by the ring gear and the gear carrier, said complementary clutch means adapted to be selectively engaged with the clutch means on the driven member for selectively connecting the ring gear or the gear carrier to the driven member.

9. A transmission comprising a planetary unit including a driving gear having relatively wide teeth and a plurality of other gears meshing with and slidable as a unit longitudinally of the driving gear, a driven member, a variable speed transmission unit, and means operated by longitudinal sliding of said gear unit to selectively connect and disconnect different ones of said other gears to said driven member and said transmission unit to produce different driving relationships.

10. A transmission comprising a driving sun gear having relatively wide teeth, a differential unit comprising a ring gear and a gear carrier having planet gears meshing with the ring gear and the sun gear, a driven member for the transmission, means for shifting the unit axially without disengaging the planet gears and the sun gear, a variable speed transmission unit, and means operated by shifting the differential unit axially to selectively connect and disconnect said ring gear and gear carrier to the driven member and the transmission unit.

11. A transmission comprising a driving sun gear having relatively wide teeth, a differential unit comprising a ring gear and a gear carrier having planet gears meshing with the ring gear and the sun gear, a driven member for the transmission, means for shifting the unit axially without disengaging the planet gears and the sun gear, a variable speed transmission unit, clutch means on said transmission unit, clutch means on said driven member, clutch means on said ring gear, and stationary clutch means, said clutch means being operably connected in various combinations by shifting of the differential unit to provide various driving relationships.

12. In a transmission a planetary gear set including a plurality of elements one of which is a driving gear having relatively wide teeth and the others of which mesh with and are shiftable as a unit axially of the driving gear without disturbing their driving relation therewith, clutch means on said other elements respectively, a driven member, clutch means on the driven member, and a clutch member held against rotation in at least one direction, the clutch means on one of said elements being connected to said clutch member and the clutch means on another element being connected to the clutch means on the driven member to drive the driven member in one direction in one axial position of said unit and the clutch means on said one element being connected to the clutch means on said driven member to drive the driven member in the other direction in another axial position of said unit.

13. A transmission comprising a driving sun gear having relatively wide teeth, a differential unit comprising a ring gear and a gear carrier having planet gears meshing with the sun gear and the ring gear, means for shifting the unit axially without disengaging the sun gear and planet gears, a driven member, means connecting the driven member to the ring gear in one axial position of the unit and to the gear carrier in another axial position of the unit, means engaging the gear carrier in said one position of the unit to prevent rotation thereof in at least one direction whereby the driven member will be driven in one direction by the ring gear, and means engaging the ring gear in said other position of the unit to prevent rotation thereof in at least one direction whereby the driven member will be driven reversely to its said first direction by the gear carrier.

14. A transmission for connecting a driving and a driven member comprising a differential gear unit parts movably mounted to be shiftable axially of the driving and driven members, clutch elements on the parts and the driving and driven members, a one-way device connected to the unit to prevent relative rotation of two of the elements thereof in one direction, and means for shifting said parts axially to connect different ones of said clutch elements to provide different driving connections between the driving and driven members through the unit and to render said one-way device operative or inoperative.

15. A transmission for connecting coaxial driving and driven members comprising an automatic torque amplifying variable speed unit connected to the driving member, a gear set having one element connected to the driving member, cooperating clutches on other elements of the gear set, the unit and the driven member, said gear set being mounted for shifting axially of the driving and driven members, and means for shifting the gear set to connect different ones of said clutches to provide different driving connections between the driving and driven members.

16. A transmission for connecting coaxial driving and driven members comprising an automatic torque amplifying variable speed unit connected to the driving member, a gear set having one element connected to the driving member, cooperating clutches on other elements of the gear set, the unit and the driven member, a one-way device connected to the gear set to prevent overrunning of one element thereof in one direction, said gear set being mounted for shifting axially of the driving and driven members, and means for shifting the gear set to connect different ones of said clutches to provide different driving connections between the driving and driven members, and to render said one-way device operative or inoperative.

17. An automatic transmission comprising a driving sun gear having relatively wide teeth, a differential unit comprising a ring gear and a gear carrier having planet gears meshing with the ring gear and the sun gear, automatic impulse-actuating driving means, a driven member for the transmission, means for shifting the unit axially without disengaging the sun gear and the planet gears, means effective in one position of said unit corresponding to forward drive for connecting the gear carrier to the impulse-actuated driving means and the ring gear to the driven member, and means effective in a different position of said unit for connecting the gear carrier to the driven member and holding the ring gear stationary to give a low-gear reverse drive.

18. An automatic transmission comprising a driving sun gear having relatively wide teeth, a differential unit comprising a ring gear and a gear carrier having planet gears meshing with the ring gear and the sun gear, automatic impulse-actuated driving means acting on said unit, a driven member for the transmission, means for shifting the unit axially without disengaging the sun gear and the planet gears, means effective in one position of said unit for connecting the ring gear to the driven member, and means effective in a different position of said unit for connecting the gear carrier to the driven member.

ADIEL Y. DODGE.
ERNEST R. KOPPEL.